United States Patent
Kassovski et al.

(10) Patent No.: US 11,366,016 B2
(45) Date of Patent: Jun. 21, 2022

(54) TEMPERATURE MEASUREMENT APPARATUS AND METHOD OF MEASURING TEMPERATURE

(71) Applicant: Melexis Technologies NV, Tessenderlo (BE)

(72) Inventors: Viktor Kassovski, Sofia (BG); Slaveyko Ivanov Slaveykov, Sofia (BG); Aleksandar Ivanov Gargavelov, Sofia (BG); Luc Buydens, Kasterlee (BE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 136 days.

(21) Appl. No.: 16/866,698

(22) Filed: May 5, 2020

(65) Prior Publication Data

US 2020/0378834 A1 Dec. 3, 2020

(30) Foreign Application Priority Data

May 30, 2019 (EP) ..................... 19177500

(51) Int. Cl.
*G01J 5/12* (2006.01)
*G01J 5/06* (2022.01)
(Continued)

(52) U.S. Cl.
CPC . *G01J 5/56* (2013.01); *G01J 5/06* (2013.01); *G01J 5/10* (2013.01); *G01J 5/12* (2013.01);
(Continued)

(58) Field of Classification Search
CPC ........ G01J 5/06; G01J 5/10; G01J 5/12; G01J 5/16; G01J 5/522; G01J 5/56;
(Continued)

(56) References Cited

U.S. PATENT DOCUMENTS 6,435,711 B1 * 8/2002 Gerlitz ..................... G01J 5/02
374/130
7,407,323 B2 * 8/2008 Hutcherson ............... G01J 5/16
374/1

FOREIGN PATENT DOCUMENTS

EP 3026406 A1 6/2016

* cited by examiner

*Primary Examiner* — Mark R Gaworecki
(74) *Attorney, Agent, or Firm* — Harness, Dickey & Pierce, P.L.C.

(57) ABSTRACT

A method of measuring temperature based upon a system of equations applying Stefan-Boltzmann's law and using a measurement value for an object to be measured and an ambient temperature value (Ta) comprises: pre-calculating (200, 202) a first vector (LUT1) and a second vector (LUT2). The first vector (LUT1) is a series of values proportional to received power based upon respective temperature values and in respect of a predetermined generic range of temperatures. The second vector (LUT2) is a series of sensitivity characteristic factor values based upon expected measured temperature values and in respect of a predetermined range of expected object measured temperatures. The first vector (LUT1) and the second vector (LUT2) are used (206) to generate a temporary vector ($LUT_T$) of a series of values limited to the ambient temperature value to solve the system of equations in respect of the measurement value for the object, thereby determining (208) a temperature (To) for the object from the measurement value.

14 Claims, 1 Drawing Sheet

(51) Int. Cl.
  *G01J 5/10*  (2006.01)
  *G01J 5/16*  (2006.01)
  *G01J 5/56*  (2006.01)
  *G01J 5/53*  (2022.01)
  *G01J 5/068*  (2022.01)
  *G01J 5/80*  (2022.01)

(52) U.S. Cl.
  CPC . *G01J 5/16* (2013.01); *G01J 5/53* (2022.01); *G01J 5/064* (2022.01); *G01J 5/068* (2022.01); *G01J 5/80* (2022.01)

(58) Field of Classification Search
  CPC ......... G01J 2005/0048; G01J 2005/067; G01J 2005/068; G01J 5/064; G01J 5/068; G01J 5/53; G01J 5/80
  See application file for complete search history.

TEMPERATURE MEASUREMENT APPARATUS AND METHOD OF MEASURING TEMPERATURE

FIELD

The present invention relates to a temperature measurement apparatus of the type that, for example, comprises a measurement sensor accompanied by an ambient temperature sensor. The present invention also relates to a method of measuring temperature, the method being of the type that, for example, uses an ambient temperature measurement in order to determine a temperature measurement for an object to be measured.

BACKGROUND

In the field of radiation detectors, particularly those used for detection of electromagnetic radiation in the infrared range of the electromagnetic spectrum, it is known to provide sensor devices whose operation is based upon thermoelectric principles, for example the so-called Seebeck effect.

In this respect, one kind of Far Infrared (FIR) detector comprises a cavity formed between two substrates in which a membrane is suspended generally centrally in the cavity by a pair of beams members that extend from the membrane to the outer periphery of the cavity, the pair of beams each incorporating thermopiles. The thermopile beams are typically disposed at opposite sides of the membrane and are used to generate an electrical signal responsive to a difference in temperature between the membrane and, in this example, the ends of the thermopiles, the electrical signal being made available to electronic circuitry, for example on the same chip, to process the signal generated.

Due to noise inherently generated by such detectors, European patent publication no. EP-A1-3 026 406 proposes a pairing of a measurement sensor with a reference sensor. The measurement sensor is of the kind described above, and the reference sensor also shares the same structure of the measurement sensor, but with the difference that the reference sensor comprises a shield layer therein to prevent electromagnetic radiation entering the cavity in which the reference sensor is disposed and hence heating the membrane in the cavity. By shielding the reference sensor from an electromagnetic signal to be measured, the reference sensor can be used to generate an output signal that can be treated as representing background thermal noise, or ambient temperature, and this output signal can be used to improve the Signal-to-Noise characteristics of a measurement signal generated by the measurement sensor.

In order to determine the temperature of an object being measured the following approximate relationship between the output voltage of the measurement sensor, Vir, the temperature of the object measured by the measurement sensor, To, an ambient temperature, Ta, measured by the reference sensor, and a sensitivity, $\alpha$, of the measurement sensor can be used to determine the temperature, To, of the object being measured by the measurement sensor.

$$Vir = \alpha_i(1+KsTa(Ta-25))(1+KsTo_i(To-To_i))(To^4 - Ta^4) \qquad (1)$$

where the above equation is expressed in respect of an interval of two measurable temperatures, To and $To_i$, and KsTa is dependence of the sensitivity on ambient sensor temperature, and $KsTo_i$ is the dependence of the sensitivity on the temperature of the object that is being measured.

Furthermore, the sensitivity $\alpha$ of the measurement sensor at a given temperature is a piecewise constant function, where the sensitivity between two temperatures, $To_{j-1}$ and $To_j$, remains constant:

$$\alpha_i = \alpha_0 \pi_{j=1}^{i}(1+KsTo_j(To_j-To_{j-1})) \qquad (2)$$

where $\alpha_0$ is the sensitivity for a predetermined reference temperature, for example To=0° C., which is considered also as $To_0$, $To_i$ are the temperatures at which the slope of sensitivity changes, and $KsTo_j$ is the dependency constant mentioned above and is used as a multiplier.

A first known technique for determining temperature of an object being measured by the measurement sensor using the above equations (1) and (2) employs a numerical method to calculate the formulae directly.

This technique requires a number of iterations to be performed before an accurate temperature is actually calculated. The number of iterations depends upon the width of the temperature range that the measurement sensor is intended to measure and the accuracy that is required. The method is, as a consequence, time consuming and requires relatively considerable processing power.

Another known technique employs lookup tables. Whilst this technique is faster than the direct computation technique, this technique requires a considerable memory capacity. As more than one combination of ambient temperature and measured temperature can correspond to the same output voltage value, Vir, of the measurement sensor, a single look-up table is inefficient, and in some cases insufficient, to calculate the temperature of the object unambiguously. Moreover, as the output voltage signal, Vir, of the measurement sensor depends upon the ambient temperature, Ta, and the measured temperature, To, of the object, the lookup tables required are two-dimensional arrays. As such, in order to deal with the ambiguity when calculating the temperature of the object, a set of three two-dimensional look-up tables is typically required. This makes the use of lookup tables memory intensive and requires a microcontroller unit possessing a relatively large memory cache.

SUMMARY

According to a first aspect of the present invention, there is provided a method of measuring temperature based upon a system of equations applying Stefan-Boltzmann's law and using a measurement value for an object to be measured and an ambient temperature value, the method comprising: pre-calculating a first vector of a series of values proportional to received power based upon respective temperature values and in respect of a predetermined generic range of temperatures; pre-calculating a second vector of a series of sensitivity characteristic factor values based upon expected measured temperature values and in respect of a predetermined range of expected object measured temperatures; and using the first vector and the second vector to generate a temporary vector of a series of values limited to the ambient temperature value to solve the system of equations in respect of the measurement value for the object, thereby determining a temperature for the object from the measurement value.

The generation of the temporary vector may further comprise: using the first vector to generate a received power value based upon the ambient temperature value.

The received power value may be calculated directly.

The generation of the temporary vector may further comprise: applying the received power value as a first compensation factor to the series of temporary values of the first vector in order to take into account the ambient temperature value in accordance with the system of equations.

The first compensation factor may be subtraction of $\alpha_o Ta^4$, where $\alpha_o$ may be a reference sensitivity used to pre-calculate the first vector in respect of a predetermined reference temperature.

The method may further comprise: updating the ambient temperature compensated series of temporary values by applying a second compensation factor based upon the ambient temperature value thereto to provide compensation for one or more physical characteristics of an ambient temperature sensor used to generate the ambient temperature value.

The application of the second compensation factor may comprise: multiplying the ambient temperature compensated series of temporary values by the compensation for the one or more physical characteristics of the ambient temperature sensor of (1+KsTa(Ta−25)), where KsTa may be a dependence of the sensitivity of the ambient temperature sensor on ambient temperature, Ta.

The method may further comprise: applying the second vector to the updated ambient temperature compensated series of temporary values in order to apply sensitivity characteristic factor values based in respect of the predetermined range of object measured temperatures.

The method may further comprise: calculating the series of sensitivity characteristic factor values of the second vector using the expression 1+KsTo(To−To$_j$), where KsTo may be a dependence of sensitivity of a measurement sensor associated with the measurement value on a temperature of the object that is being measured.

The method may further comprise: applying an emissivity compensation factor to the temporary vector.

The method may further comprise: storing the first vector as a first lookup table.

The method may further comprise: storing the second vector as a second lookup table.

The method may further comprise: storing the temporary vector as a temporary lookup table.

According to a second aspect of the invention, there is provided a temperature measurement apparatus comprising: an object measurement sensor configured to generate a measurement value; an ambient temperature sensor configured to generate an ambient temperature value; a processing resource configured to calculate a temperature for an object to be measured based upon a system of equations applying Stefan-Boltzmann's law, the measurement value for the object to be measured and the ambient temperature value; wherein the processing resource supports a first vector calculator configured to pre-calculate a first vector of a series of values proportional to received power based upon respective temperature values and in respect of a predetermined generic range of temperatures, and a second vector calculator configured to pre-calculate a second vector of a series of sensitivity characteristic factor values based upon measured temperature values and in respect of a predetermined range of object measured temperatures; and the processing resource is configured to use the first vector and the second vector to generate a temporary vector of a series of values limited to the ambient temperature value to solve the system of equations in respect of the measurement value for the object, thereby determining a temperature for the object from the measurement value.

According to a third aspect of the invention, there is provided a sensor array comprising the temperature measurement apparatus as set forth above in relation to the second aspect of the invention.

According to a fourth aspect of the invention, there is provided a method of calculating a temperature from a measurement value from a measurement sensor and an ambient temperature value from an ambient temperature sensor accompanying the measurement sensor, the method comprising: solving a system of equations applying Stefan-Boltzmann's law by: pre-calculating a first portion of the system of equations in respect of a predetermined range of measurement temperature values and constraining the pre-calculated first portion of the system of equations in respect of the ambient temperature value; and pre-calculating a second portion of the system of equations relating to sensitivity of the measurement sensor in respect of the predetermined range of measurement temperature values; applying the second pre-calculated second portion to the pre-calculated first portion of the system of equations to yield a series of temperature values and a respective series of measurement values; and determining a temperature for the object by looking up the temperature value from the series of temperature values by reference to the measurement value.

It is thus possible to provide an apparatus and method having a shorter calculation time, while providing sufficient accuracy of temperature measurement. Additionally, the desired accuracy can be achieved after a single iteration of the method. Furthermore, it is not necessary to calculate a fourth root as would be required by the direct calculation technique mentioned above. Such calculations are processor intensive and time consuming. Less storage capacity is also required as compared with other techniques that employ lookup tables.

BRIEF DESCRIPTION OF THE DRAWINGS

At least one embodiment of the invention will now be described, by way of example only, with reference to the accompanying drawings, in which.

DETAILED DESCRIPTION OF THE EXAMPLE EMBODIMENTS

Figure 1:
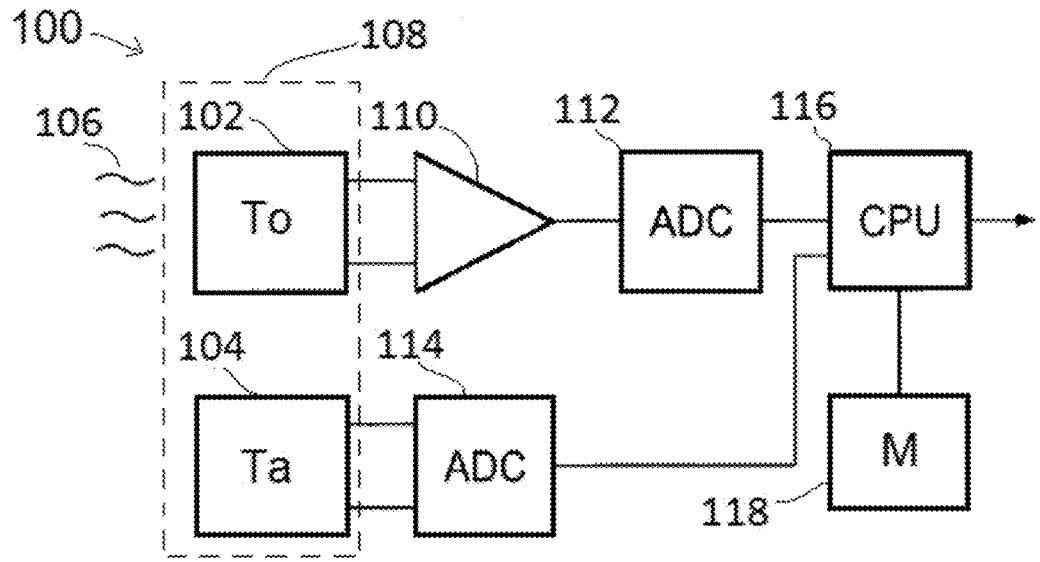
FIG. 1 is a schematic diagram of a temperature measurement apparatus constituting an embodiment of the invention.

Throughout the following description, identical reference numerals will be used to identify like parts.

Referring to FIG. 1, an electromagnetic radiation measurement apparatus 100 comprises a first thermopile sensor 102 and a second temperature sensor 104. The first thermopile sensor 102 is configured to sense radiation, for example electromagnetic radiation, such as electromagnetic radiation in the infrared range of the electromagnetic spectrum, from a so-called object space or scene, whereas the second temperature sensor 104 is arranged to serve as a reference, and configured to sense the same kind of radiation as the first thermopile sensor 102.

The first thermopile sensor 102 is, in this example, configured to receive infrared radiation that is correlative to a temperature, To, of a remote object (not shown) emitting radiation 106. The first thermopile sensor 102 provides a low-level analogue output signal that varies with both the temperature, To, of the object and ambient temperature, Ta. The second temperature sensor 104 measures the ambient temperature, Ta, of the thermopile and is located proximate to the first thermopile sensor 102. The first thermopile sensor 102 and second temperature sensor 104 together form a temperature sensor module 108. The second temperature sensor 104 can be any suitable type of sensor, for example a resistance temperature detector (RTD) such as a thermistor, or a silicon temperature sensor, for example a silicon temperature sensor circuit such as a Proportional To Ambient Temperature (PTAT) sensor or a Negative Temperature Coefficient (NTC) sensor. For some applications, the second temperature sensor 104 can be a non-contact type temperature sensor.

The first thermopile sensor 102 is operably coupled to an amplifier unit, for example a low-noise amplifier 110, an output of the low-noise amplifier being operably coupled to a first analogue-to-digital converter 112. The second temperature sensor 104 is operably coupled to a second analogue-to-digital converter 114. Although, in this example, the second temperature sensor 104 is not operably coupled to the second analogue-to-digital converter 114 via another amplification circuit, a further amplification circuit, for example a further low-noise amplifier, can be operably coupled to the output of the second temperature sensor 104 and the output of the further low-noise amplifier can be operably coupled to the second analogue-to-digital converter 114. As an alternative for any appropriate embodiment, the first thermopile sensor 102 and the second temperature sensor 104 can be both operably coupled to a common analogue-to-digital converter, i.e. the common analogue-to-digital converter can be shared by the first thermopile sensor 102 and the second temperature sensor 104.

The outputs of the first and second analogue-to-digital converters 112, 114 are respectively operably coupled to a processing resource 116. The processing resource 116 can be any processor-based or microprocessor-based system including systems using microcontrollers, reduced instruction set circuits (RISC), application specific integrated circuits (ASICs), Field Programmable Gate Arrays (FPGAs), logic circuits, and any other circuit or processor capable of executing the functionality described later herein.

A memory 118 is operably coupled to the processing resource 116. The memory 118 can be of any suitable type of memory, for example non-volatile memory, such as a Read Only Memory (ROM) and/or volatile memory, such as a Random Access Memory (RAM), EPROM memory, EEPROM memory, digital memory, such as non-volatile RAM (NVRAM). In the present example, the memory 118 is used to store lookup tables (LUTs) of thermopile output voltage versus object temperature characteristic values, along with information that can be required for calculating the temperature To of the object and/or pre-processing, for example calibration data, such as an alpha value of the sensor, gain factors, and/or offset compensation values. The processing resource 118 is used to perform the necessary calculations and lookup processes as will now be described below.

Figure 2:
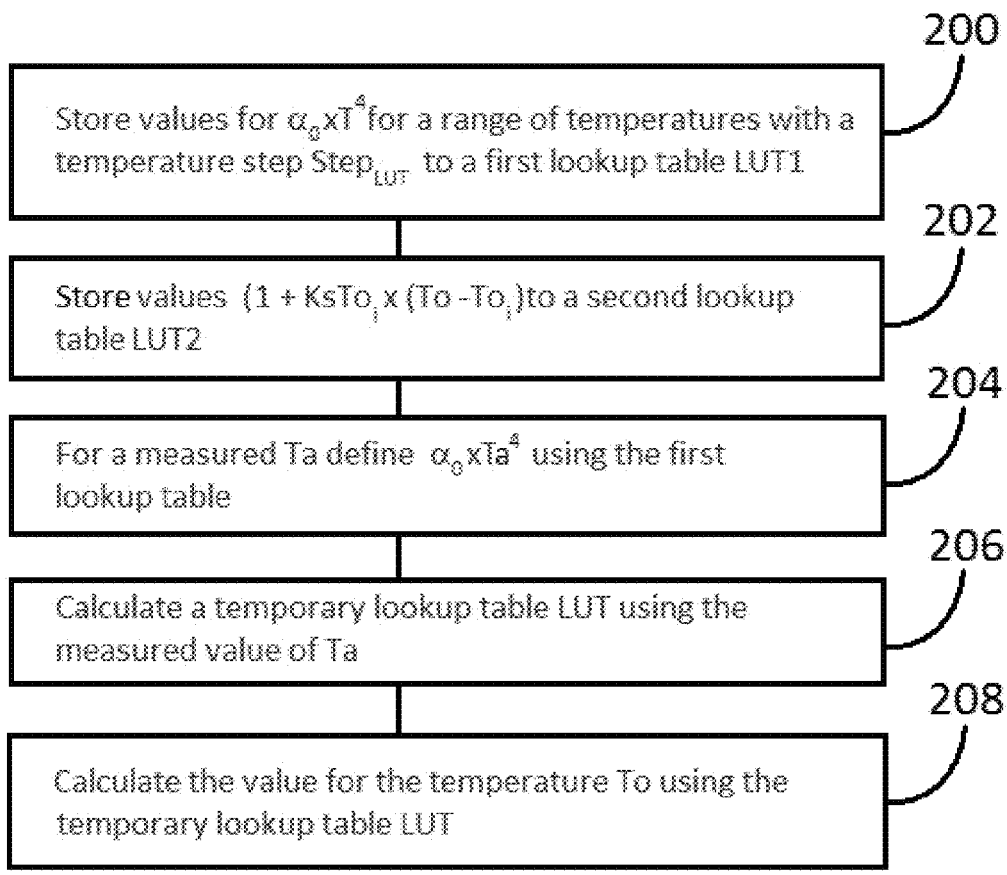
FIG. 2 is a flow diagram of a method of measuring temperature constituting another embodiment of the invention.

In operation (FIG. 2), the object emits the electromagnetic radiation 106 in the infrared range of the electromagnetic spectrum, the electromagnetic radiation 106 being incident upon the measurement thermopile sensor 102. Background, ambient, electromagnetic radiation in the infrared range of the electromagnetic spectrum is incident upon both the measurement thermopile sensor 102 and the ambient temperature sensor 104.

Equations (1) and (2) mentioned above constitute a system of equations that applies Stefan-Bolzmann's law. These equations In the following example, portions of these equations are evaluated over ranges of input values, and stored in lookup tables, in order to improve the efficiency of solving the system of equations for a given measurement sensor output signal.

For a temperature range over which the measurement apparatus 100 is intended to measure, the processing resource 116 calculates (Step 200) a first lookup table, LUT1, comprising pre-calculated generic evaluations of $\alpha_0 T^4$. In this respect, the processing resource 116 can support a first vector calculator (not shown) to generate the first lookup table, LUT1. The range of temperature values covered is, as intimated above, a selectable design option, and so predetermined, and in this example contains all values of ambient temperature, Ta, and measured object temperature, To, envisaged to be looked up during operation of the measurement apparatus 100. The lookup table, LUT1, effectively stores a vector of a series of values corresponding to the temperature points within the selected range and having a temperature step size, $Step_{LUT}$.

The processing resource 116 then, for example by supporting a second vector calculator (not shown), pre-calculates (Step 202) values from evaluating the expression $(1+KsTo(To-To_j))$ for the same temperature range as used in respect of the first lookup table, LUT1, and stores the results as a second lookup table, LUT2, which effectively stores a vector of values corresponding to the temperature points within the selected range and having the same temperature step size, $Step_{LUT}$. The second lookup table constitutes an evaluation of a sensitivity characteristic factor of equation (2) used to calculate sensitivity, $\alpha_i$, and comprises a series of sensitivity characteristic factor values that are respectively based upon expected measured temperature values in the above-mentioned predetermined range, which is in this example a predetermined range of expected object measurement temperatures.

As the output signal generated by the apparatus depends upon both the ambient temperature, Ta, and the temperature of the object, To, and the first and second lookup tables are unidirectional and do not take into account the influence of the ambient temperature, Ta, a third lookup table is required as will be described later herein. In this regard, as will be described below, the first and second vectors are used to generate the temporary vector of, in this example, a series of values evaluated so as to be limited by the ambient temperature, which in turn is used to solve the system of equations mentioned above in respect of an output signal generated by the measurement thermopile sensor 102, thereby enabling the temperature, To, of the object to be looked up. As will be described later herein, a number of stages can be involved in generating the temporary lookup table, depending upon the refinement and/or compensation that is considered desirable to be applied.

After calculating the first and second lookup tables, LUT1, LUT2, the ambient temperature, Ta, is determined from the output of the ambient temperature sensor 104, and the first lookup table, LUT1, is used to determine (Step 204) the value of $\alpha_0 Ta^4$. If the ambient temperature, Ta, operating range is not within the same range as the range of temperatures for measuring the object, To, the following evaluation of $\alpha_0 Ta^4$ should be replaced by a direct mathematical calculation.

If the ambient temperature, Ta, is however within the same operating range of the measurement temperature, To, in respect of the first lookup table, LUT1, the first lookup table, LUT1, is employed to evaluate a received power value associated with the second temperature sensor, $\alpha_0 Ta^4$. Of course, in other embodiments, it can be desirable to calculate $\alpha_0 Ta^4$ directly instead of using the first lookup table, LUT1, because the expression is not computationally burdensome.

In this regard, it is expected that the ambient temperature, Ta, falls between two values in the first lookup table, LUT1, and so in this example linear interpolation is performed, and the closest two temperature point to the ambient temperature, Ta, already known from the ambient temperature sensor 104 are selected and the data corresponding to the two temperature data points are used to determine a gradient, Ga, of a line notionally extending between the two results of $\alpha_0 Ta^4$ corresponding to the two ambient temperature data points selected.

$$Ga = \frac{LUT1(i+1) - LUT1(i)}{Step_{LUT}} \qquad (3)$$

where i is the index of the temperature data point in the first lookup table, LUT1, and LUT1($i$) is the evaluation of $\alpha_0 Ta^4$ at the ith temperature data point below or equal to the ambient temperature, Ta, obtained from the ambient temperature sensor 104, and $Step_{LUT}$ is as defined above, i.e. the difference between the two temperature data points selected.

Using the assumption of linearity between temperature data points, and knowing the gradient Ga, and the temperature data points selected from the first lookup table, LUT1, $\alpha_0 Ta^4$ can be evaluated for the ambient temperature, Ta, measured by the second temperature sensor 104:

$$\alpha_0 Ta^4 = LUT1(i) + Ga(Ta - Ti) \qquad (4)$$

where LUT1($i$) is the evaluation of $\alpha_0 Ta^4$ at the first (lower) temperature data point, i, and Ti is the temperature at of the temperature data point, i.

Thereafter, the processing resource 116 calculates (Step 206) a temporary lookup table, $LUT_T$, using the measured ambient temperature value, Ta, in the following manner.

Firstly, the ambient temperature, Ta, variable is eliminated from any subsequent on-the-fly calculation by performing pre-calculations evaluating portions of equation (1) that involve the ambient temperature, Ta. This is done in respect of all entries in the first lookup table, LUT1. In this respect, a first iteration of the first lookup table, LUT1', where the dependence upon the ambient temperature is eliminated, is calculated as follows:

$$LUT1_i' = (LUT1_i - \alpha_0 Ta^4)(1 + KsTa(Ta - 25)) \qquad (5)$$

This first iteration applies the received power value associated with the ambient temperature, Ta, as a first compensation factor and a second compensation factor for one of more physical characteristic of the second temperature sensor 104, for example (1+KsTa(Ta−25)). After elimination of the dependence upon the ambient temperature, Ta, the processed first lookup table, LUT1', is processed further to eliminate the need to perform on-the-fly calculations in respect of equation (2) and hence the dependence of future calculations on the measured temperature, To, of the object in respect of equation (2). In this regard, the entries of the processed first lookup table, LUT1', are multiplied by corresponding entries of the second lookup table, LUT2, which constitutes sensitivity characteristic factor values:

$$LUT1_i'' = LUT1_i' \times LUT2_i \qquad (6)$$

After eliminating the dependence upon the measured temperature, To, of the object in respect of equation (2), the values of the twice processed first lookup table, LUT1" (the temporary lookup table $LUT_T$), are compensated for emissivity:

$$LUT_{T_i} = LUT1_i'' \times \varepsilon \qquad (7)$$

As will be appreciated, since the ambient temperature, Ta, varies, the process of eliminating dependence upon the ambient temperature, Ta, has to be performed whenever the ambient temperature, Ta, changes. As such, in this example, the generation of the temporary lookup table, $LUT_T$, is performed whenever the temperature of the object, To, has to be measured. In another embodiment, the temporary lookup table, $LUT_T$, is reconstructed whenever the ambient temperature, Ta, varies by at least or more than a predetermined temperature margin. However, the skilled person will appreciate that by permitting a temperature margin before recalculating the temporary lookup table, $LUT_T$, introduces a corresponding error margin into the measured temperature, To, of the object.

Once the temporary lookup table, $LUT_T$, has been calculated, the measured temperature, To, of the object can be calculated (Step 208). To use the temporary lookup table, $LUT_T$, a compensation has to be applied to the output signal generated by the first thermopile sensor 102 in order to take into account the sensitivity of the first thermopile sensor 102.

$$IRdata_C = \frac{\alpha_0}{\alpha_{sensor}} IR_{sensor} \qquad (8)$$

where $IR_{sensor}$ is the output value generated in respect of the first thermopile sensor 102, and $\alpha_{sensor}$ is a calibration parameter for a given sensor determined during a test phase during production of the temperature sensor module 108.

As it is possible for the $IRdata_C$ value calculated to fall between two lookup values of the temporary lookup table, $LUT_T$, linear interpolation can again be employed to determine the measured temperature, To, of the object from the temporary lookup table, $LUT_T$. As such, two data points of the temporary lookup table, $LUT_T$, closest to, i.e. either side of, the calculated $IRdata_C$ value are selected and the gradient between the two data points of the temporary lookup table, $LUT_T$, selected.

$$G_T = \frac{LUT(i+1) - LUT(i)}{Step_{LUT_T}} \qquad (9)$$

where i and i+1 are the indices of the IRdata values in the temporary lookup table, $LUT_T$, data points just below (or equal to) and just above the $IRdata_C$ point calculated, respectively, i.e. $IRdata_i$ and $IRdata_{i+1}$, and $StepLUT_T$, is the step size between successive temperature data points in the temporary lookup table, $LUT_T$.

Using the gradient, $G_T$, calculated in respect of the temporary lookup table, $LUT_T$, the measured temperature, To, of the object can be determined (Step 208) from the temperature point, Ti, selected in respect of the $IRdata_i$ data point selected that is just below (or equal to) the IR data point calculated and the difference between the $IRdata_C$ point calculated and $IRdata_i$:

$$To = Ti + \frac{(IRdata_C - IRdata_i)}{G_T} \qquad (10)$$

where Ti is the temperature obtained from the temporary lookup table, $LUT_T$, in respect of the $IRdata_i$ data point.

By way of comparison, an exemplary infrared sensor comprising 768 pixels cooperating with an MBED LPC1768 platform with high performance ARM Cortex M3 Core running at 96 MHz would take 58 ms to determine the temperature of an object that is at 40° C. and 150 ms for an object that is at 600° C. using a direct calculation technique. In contrast, using the above technique, the same two calculations both take 10 ms.

In terms of memory requirements, to support measurement of an object temperature (To) range of −100° C. to 500° C., using a lookup table technique where 5° C. step sizes are used in each lookup table and where the ambient temperature range is −40° C. to 85° C., 3 lookup tables would be requires, each lookup table having 121 lines×26 columns. This dictates a total memory requirement of 19 Kbytes. In contrast, using the above-described technique, only 2 lookup tables are required, each comprising 121 lines. This translates into a total memory requirement of less than 500 bytes.

As can be seen from the above examples, the system of equations is solved through evaluating through pre-calculation of a first portion of the system of equations in respect of the predetermined range of expected measurement values and where the pre-calculation is constrained to the ambient temperature value. A second portion of the system of equations relating to sensitivity of the first thermopile sensor 102 is then evaluated by pre-calculation in respect of the predetermined range of expected measurement values, followed by the application of the pre-calculation of the second portion of the system of equations to the pre-calculation of the first portion of the system of equations. This yields a series of temperature values and a respective series of measurement values, and this series can be used to determine a temperature of the object by looking up the temperature by reference to a particular measurement value obtains in respect of the first thermopile sensor 102.

The skilled person should appreciate that the above-described implementations are merely examples of the various implementations that are conceivable within the scope of the appended claims. Indeed, it should be appreciated that although the examples set forth herein describe the use of thermopile sensors, any suitable type of temperature sensor can be employed, for example Bolometer devices. Also, although a single pair of temperature sensors is described herein, the skilled person should appreciate that the above examples are applicable to arrays of multiple sensors, the method and apparatus providing additional benefits in the context of arrays of sensors where temperature calculations need to be performed in respect of multiple elements of the array.

It should be appreciated that references herein to "infrared", other than where expressly stated otherwise, are intended as references to electromagnetic energy having wavelengths in the range of 700 nm to 1 mm, such as 760 nm to 1 mm or 700 nm to 1500 nm, which includes electromagnetic radiation in the near infrared region, the middle infrared region and the far infrared region.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

What is claimed is:

1. A method of measuring temperature based upon a system of equations applying Stefan-Boltzmann's law and using a measurement value for an object to be measured and an ambient temperature value, the method comprising:
    pre-calculating a first vector of a series of values proportional to received power based upon respective temperature values and in respect of a predetermined generic range of temperatures;
    pre-calculating a second vector of a series of sensitivity characteristic factor values based upon expected values of measured temperature and in respect of a predetermined range of expected values of measured temperatures; and
    using the first vector and the second vector to generate a temporary vector of a series of values limited to the ambient temperature value to solve the system of equations in respect of the measurement value for the object, thereby determining a temperature for the object from the measurement value.

2. The method according to claim 1, wherein the generation of the temporary vector further comprises:
    using the first vector to generate a received power value based upon the ambient temperature value.

3. The method according to claim 2, wherein the generation of the temporary vector further comprises:
    applying the received power value as a first compensation factor to the series of values of the first vector in order to take into account the ambient temperature value in accordance with the system of equations.

4. The method according to claim 3, wherein the first compensation factor includes a subtraction operation of $\alpha o Ta^4$, where $\alpha o$ is a reference sensitivity used to pre-calculate the first vector in respect of a predetermined reference temperature and Ta is the ambient temperature value.

5. The method according to claim 3, further comprising:
    updating the ambient temperature compensated series of values by applying a second compensation factor based upon the ambient temperature value thereto to provide compensation for one or more physical characteristics of an ambient temperature sensor used to generate the ambient temperature value.

6. The method according to claim 5, wherein the application of the second compensation factor comprises:
    multiplying the ambient temperature compensated series of values by the compensation for the one or more physical characteristics of the ambient temperature sensor of $(1+KsTa(Ta-25))$, where $KsTa$ is a dependence of the sensitivity of the ambient temperature sensor on ambient temperature, Ta.

7. The method according to claim 5, further comprising:
    applying the second vector to the updated ambient temperature compensated series of values in order to apply the sensitivity characteristic factor values in respect of the predetermined range of object measured temperatures.

8. The method according to claim 7, further comprising:
    applying an emissivity compensation factor to the temporary vector.

9. The method according to claim 1, further comprising:
    calculating the series of sensitivity characteristic factor values of the second vector using the expression $1+KsTo(To-To_t)$, where $KsTo$ is a dependence of sensitivity of a measurement sensor associated with the measurement value on a temperature ($T_{oi}$) of the object that is being measured, where $T_o$ is a predetermined reference temperature value, and I is an index value.

10. The method according to claim 1, further comprising: storing the first vector as a first lookup table.

11. The method according to claim 1, further comprising: storing the second vector as a second lookup table.

12. The method according to claim 1, further comprising: storing the temporary vector as a temporary lookup table.

13. A temperature measurement apparatus comprising:
an object measurement sensor configured to generate a measurement value;
an ambient temperature sensor configured to generate an ambient temperature value;
a processing resource configured to calculate a temperature for an object to be measured based upon a system of equations applying Stefan-Boltzmann's law, the measurement value for the object to be measured and the ambient temperature value; wherein
  the processing resource supports a first vector calculator configured to pre-calculate a first vector of a series of values proportional to received power based upon respective temperature values and in respect of a predetermined generic range of temperatures; and
  a second vector calculator is configured to pre-calculate a second vector of a series of sensitivity characteristic factor values based upon measured temperature values and in respect of a predetermined range of object measured temperatures; and
  the processing resource is configured to use the first vector and the second vector to generate a temporary vector of a series of values limited to the ambient temperature value to solve the system of equations in respect of the measurement value for the object, thereby determining a temperature for the object from the measurement value.

14. A sensor array comprising a temperature measurement apparatus, the temperature measurement apparatus comprising:
an object measurement sensor configured to generate a measurement value;
an ambient temperature sensor configured to generate an ambient temperature value;
a processing resource configured to calculate a temperature for an object to be measured based upon a system of equations applying Stefan-Boltzmann's law, the measurement value for the object to be measured and the ambient temperature value; wherein
  the processing resource supports a first vector calculator configured to pre-calculate a first vector of a series of values proportional to received power based upon respective temperature values and in respect of a predetermined generic range of temperatures; and
  a second vector calculator is configured to pre-calculate a second vector of a series of sensitivity characteristic factor values based upon measured temperature values and in respect of a predetermined range of object measured temperatures; and
  the processing resource is configured to use the first vector and the second vector to generate a temporary vector of a series of values limited to the ambient temperature value to solve the system of equations in respect of the measurement value for the object, thereby determining a temperature for the object from the measurement value.

* * * * *